US011691569B2

(12) United States Patent
Kenmochi (10) Patent No.: US 11,691,569 B2
(45) Date of Patent: Jul. 4, 2023

(54) VEHICULAR DOOR MIRROR DEVICE

(71) Applicant: KABUSHIKI KAISHA HONDA LOCK, Miyazaki (JP)

(72) Inventor: Kenji Kenmochi, Miyazaki (JP)

(73) Assignee: Kabushiki Kaisha Honda Lock, Miyazaki (JP)

(*) Notice: Subject to any disclaimer, the term of this patent is extended or adjusted under 35 U.S.C. 154(b) by 129 days.

(21) Appl. No.: 17/601,845

(22) PCT Filed: May 7, 2020

(86) PCT No.: PCT/JP2020/018528
§ 371 (c)(1),
(2) Date: Oct. 6, 2021

(87) PCT Pub. No.: WO2020/230687
PCT Pub. Date: Nov. 19, 2020

(65) Prior Publication Data
US 2022/0194297 A1    Jun. 23, 2022

(30) Foreign Application Priority Data
May 10, 2019   (JP) ................................. 2019-089884

(51) Int. Cl.
*B60R 1/12*    (2006.01)
*B60Q 1/34*    (2006.01)
*B60R 1/06*    (2006.01)

(52) U.S. Cl.
CPC .............. *B60R 1/1207* (2013.01); *B60Q 1/34* (2013.01); *B60R 1/06* (2013.01)

(58) Field of Classification Search
CPC ............ B60R 1/06; B60R 1/1207; B60Q 1/34
See application file for complete search history.

(56) References Cited

U.S. PATENT DOCUMENTS

| 8,568,006 B2 | 10/2013 | Asai |
| 2001/0013982 A1 | 8/2001 | Rommel |

FOREIGN PATENT DOCUMENTS

| JP | 2007-137125 A | 6/2007 |
| JP | 2008-137569 A | 6/2008 |
| JP | 2009-248693 A | 10/2009 |
| JP | 2012-116225 A | 6/2012 |
| WO | 2008/068573 A2 | 6/2008 |

*Primary Examiner* — Thomas M Sember
(74) *Attorney, Agent, or Firm* — Carrier, Shende & Associates, P.C.; Joseph P. Carrier; Fulchand P. Shende (57) ABSTRACT

A vehicular door mirror device is provided which includes an engagement claw provided on one of a lamp unit and a mirror housing being engaged with a latching part provided on the other of the lamp unit and the mirror housing, wherein the mirror housing includes a housing main body that has a mirror housing recess part and is pivotably supported by a base member, and a cover that has the slit formed therein and is mounted on the housing main body so as to cover the housing main body from a side opposite to an open direction of the mirror housing recess part, the cover being provided with a restriction part that restricts displacement of the engagement claw toward a direction in which the engagement claw disengages from the latching part. The lamp unit is thus prevented from detaching from the mirror housing even under an external impact.

3 Claims, 7 Drawing Sheets

VEHICULAR DOOR MIRROR DEVICE

TECHNICAL FIELD

The present invention relates to a vehicular door mirror device that includes a mirror housing that has a mirror housing recess part having a mirror housed therein and a lamp unit that has a side turn lamp having part thereof facing a slit formed in the mirror housing, an engagement claw provided on one of the lamp unit and the mirror housing being engaged with a latching part provided on the other of the lamp unit and the mirror housing.

BACKGROUND ART

Such a vehicular door mirror device is known from, for example, Patent Document 1, and in this arrangement a lamp unit is mounted on a mirror housing by engaging an engagement claw provided on the lamp unit with a latching part provided on the mirror housing.

PRIOR ART DOCUMENTS

Patent Documents

Patent Document 1: Japanese Patent Application Laid-open No. 2007-137125

DISCLOSURE OF INVENTION

Problems to be Solved by the Invention

In the arrangement disclosed in Patent Document 1 above, since the necessity for screw fastening is eliminated, and the lamp unit is mounted on the mirror housing only by engaging the engagement claw with the latching part, when an external impact acts on the mirror housing, there is a possibility that the engagement of the engagement claw with the latching part will be released and the lamp unit will be detached from the mirror housing.

The present invention has been accomplished in light of such circumstances, and it is an object thereof to provide a vehicular door mirror device that can prevent a lamp unit from being detached from a mirror housing even when an external impact, etc. acts on the mirror housing.

Means For Solving the Problems

In order to attain the above object, according to a first aspect of the present invention, there is provided a vehicular door mirror device comprising a mirror housing that has a mirror housing recess part having a mirror housed therein and a lamp unit that has a side turn lamp having part thereof facing a slit formed in the mirror housing, an engagement claw provided on one of the lamp unit and the mirror housing being engaged with a latching part provided on the other of the lamp unit and the mirror housing characterized in that the mirror housing comprises a housing main body that has the mirror housing recess part and is pivotably supported by a base member mounted on a vehicle side door, and a cover that has the slit formed therein and is mounted on the housing main body so as to cover the housing main body from a side opposite to an open direction of the mirror housing recess part, the cover being provided with a restriction part that restricts displacement of the engagement claw toward a direction in which the engagement claw disengages from the latching part.

Further, according to a second aspect of the present invention, in addition to the first aspect, the engagement claw is provided integrally with the housing main body, and the restriction part is provided integrally with the cover so as to protrude in a rib shape toward the housing main body side so that the restriction part is close to and opposes the engagement claw when the cover is mounted on the housing main body.

Furthermore, according to a third aspect of the present invention, in addition to the second aspect, a guide portion is formed on the restriction part, the guide portion guiding mounting of the cover onto the housing main body side by abutting against an extremity part of the engagement claw when the cover is mounted on the housing main body.

Effects of the Invention

In accordance with the first aspect of the present invention, since displacement of the engagement claw in the direction in which engagement thereof with the latching part is released is restricted by the restriction part, while reducing the cost by enabling the lamp unit to be mounted on the housing main body of the mirror housing due to the engagement claw engaging with the latching part, even when an external impact, etc. acts on the mirror housing, it is possible to prevent the lamp unit from being detached from the housing main body of the mirror housing.

Furthermore, in accordance with the second aspect of the present invention, since the engagement claw is provided integrally with the housing main body, and the restriction part, which is close to and opposes the engagement claw when the cover is mounted onto the housing main body, is provided integrally with the cover so as to protrude in a rib shape toward the housing main body side, it is possible, by merely mounting the cover on the housing main body, to restrict displacement of the engagement claw in the engagement release direction.

Moreover, in accordance with the third aspect of the present invention, since mounting of the cover onto the housing main body side is guided by the guide portion of the restriction part abutting against the extremity part of the engagement claw when the cover is mounted on the housing main body, it becomes easy to mount the cover onto the housing main body and, moreover, it is unnecessary to provide the cover with a special guide portion other than the restriction part, thus enabling the cost of molding the cover to be reduced.

EXPLANATION OF REFERENCE NUMERALS AND SYMBOLS

11 Mirror
12 Mirror housing
13 Mirror housing recess part
14 Housing main body
15 Cover
18 Slit
19 Side turn lamp
20 Lamp unit
21 Base member
28, 29 Engagement claw
31, 32 Latching part
47, 48 Restriction part
47a, 48a Guide portion

MODES FOR CARRYING OUT THE INVENTION

An embodiment of the present invention is explained below while referring to the attached FIG. 1 to FIG. 7.
First Embodiment First, in FIG. 1 and FIG. 2, a mirror housing 12 having fitted therein a mirror 11 for viewing to the rear of a vehicle is disposed on left and right front side doors in a passenger vehicle so that the mirror housing 12 can pivot between a raised position in which it protrudes to the side from the front side door and a retracted position in which it is retracted toward the front side door.

Figure 3:
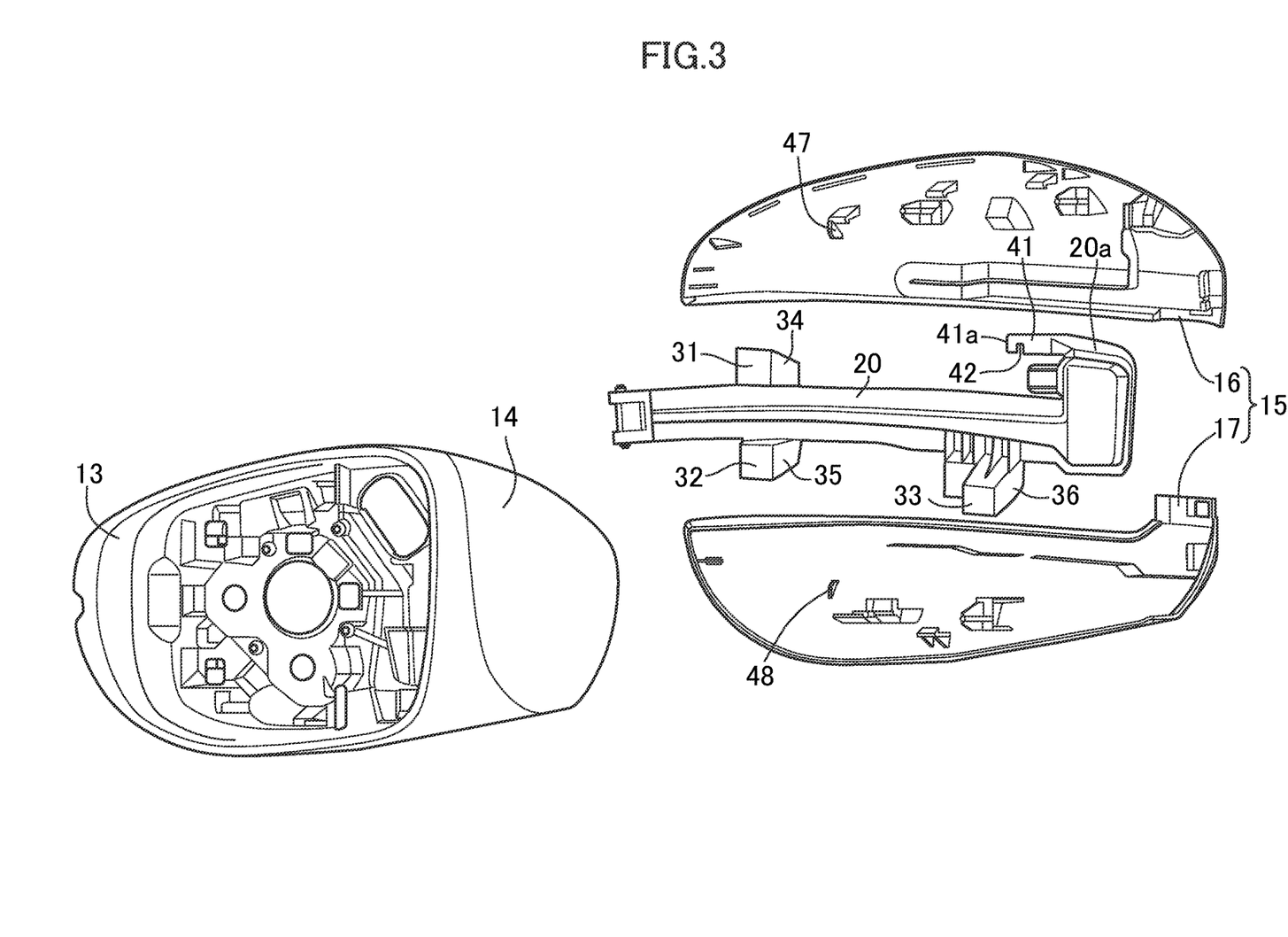
FIG. 3 is an exploded perspective view of a mirror housing and a lamp unit. (first embodiment)

Referring in addition to FIG. 3, the mirror housing 12 is formed from a housing main body 14 that is made of a resin and has a mirror housing recess part 13 having the mirror 11 housed therein, and a cover 15 that is mounted on the housing main body 14 by elastic engagement so as to cover the housing main body 14 from the side opposite to the open direction of the mirror housing recess part 13.

The cover 15 is formed from an upper cover member 16 that is made of a resin, and a lower cover member 17 that is made of a resin and is elastically engaged with the upper cover member 16. A slit 18 is formed between the upper cover member 16 and the lower cover member 17, and a lamp unit 20 having a side turn lamp 19 having part thereof facing the slit 18 is mounted in the mirror housing 12 so as to be housed within the mirror housing 12.

The mirror 11 is retained by a mirror holder, which is not illustrated, and the mirror 11 retained by the mirror holder is disposed in an opening of the housing main body 14, that is, an open end part of the mirror housing recess part 13.

Figure 1:
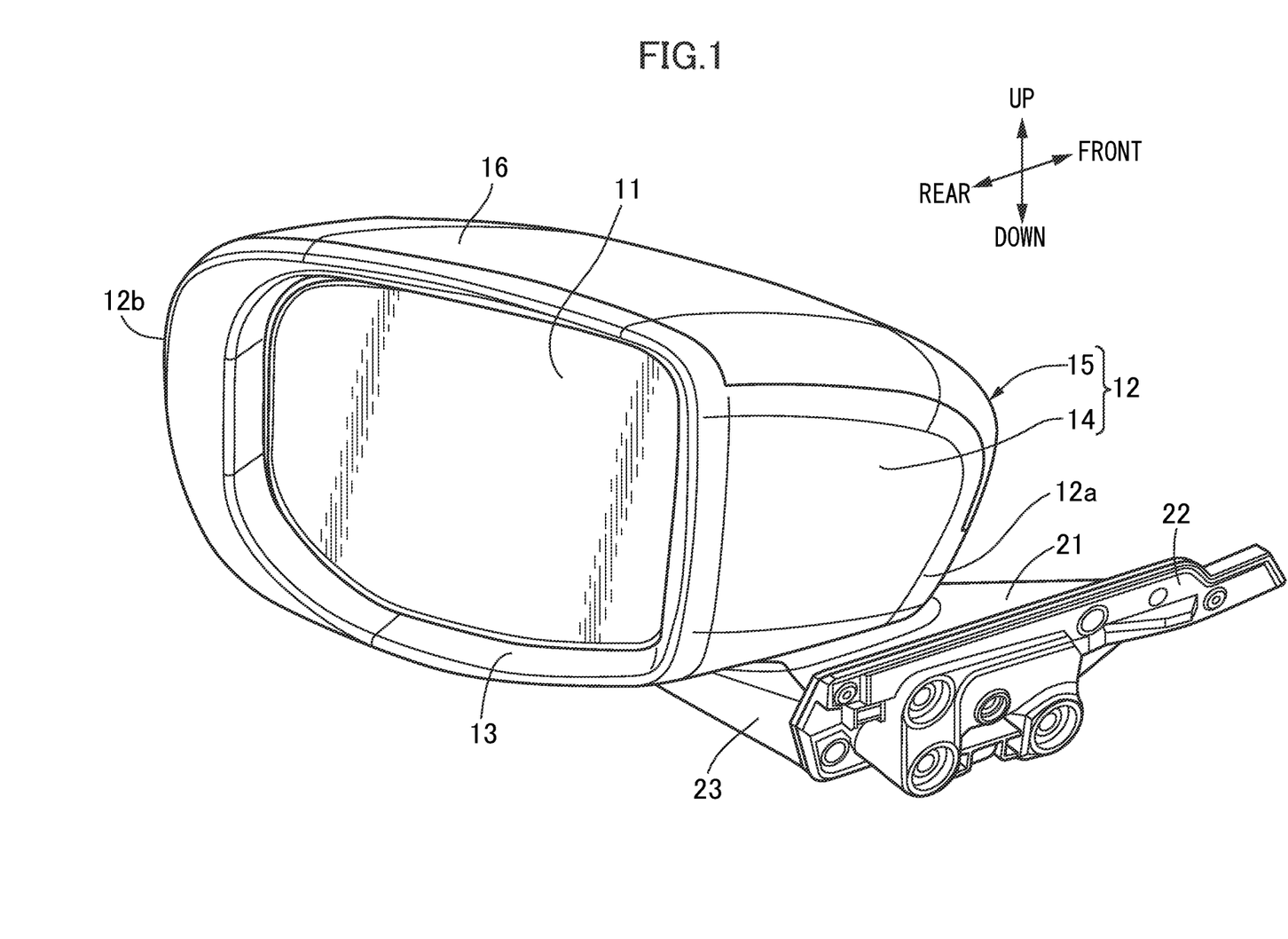
FIG. 1 is a perspective view when a vehicular door mirror is viewed obliquely from the rear. (first embodiment)
Figure 2:
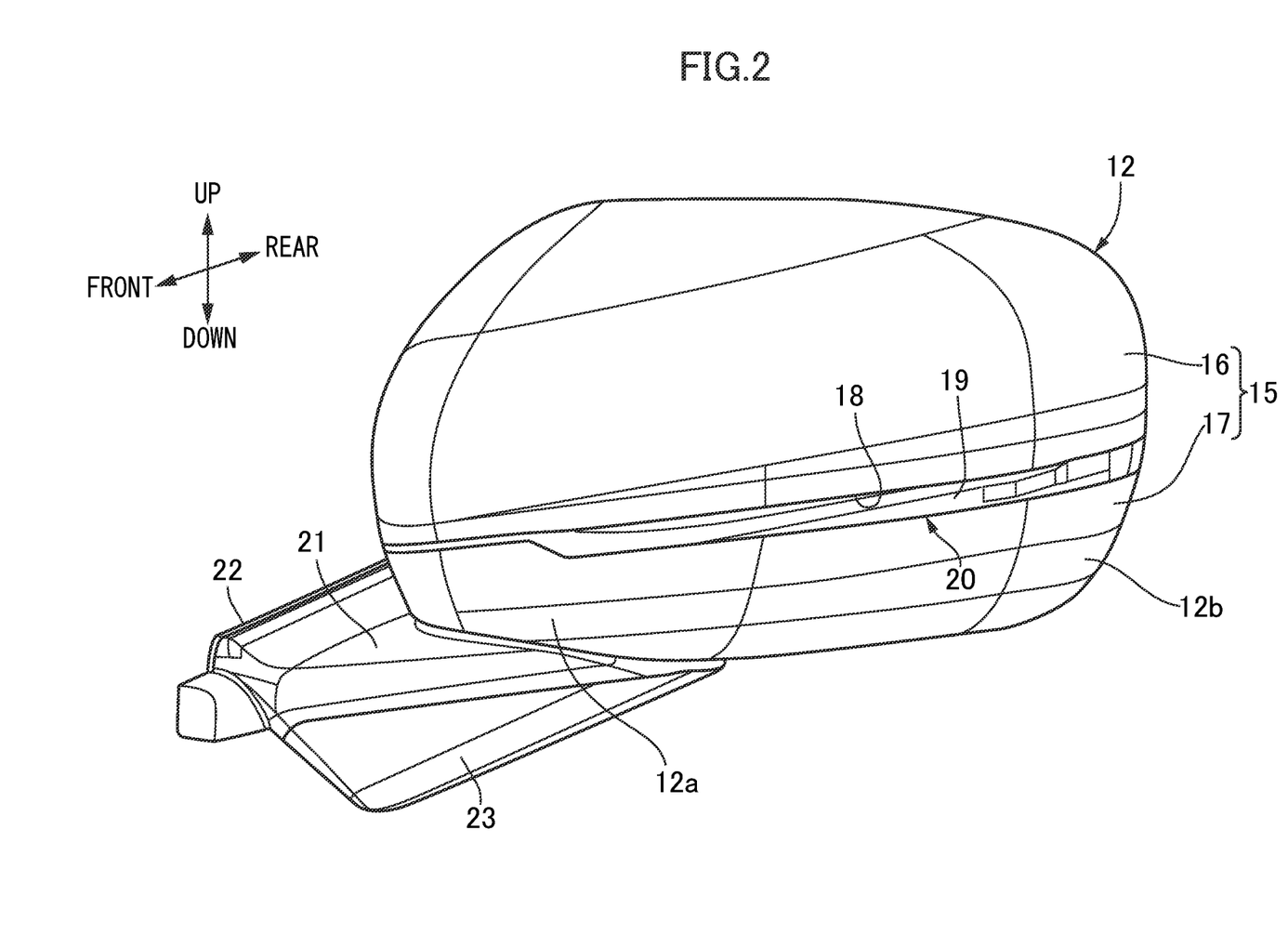
FIG. 2 is a perspective view when the vehicular door mirror is viewed obliquely from the front. (first embodiment)

A base member 21 that is made of a resin is mounted on the front side door so that a seat base 22 that is made of a resin is disposed between the base member 21 and the front side door, and a base end portion 12a of the mirror housing 12 is pivotably supported on the base member 21 at a position spaced outward from the front side door. A base cover 23 that is made of a resin and covers the base member 21 from below is detachably mounted on the base member 21.

Figure 4:
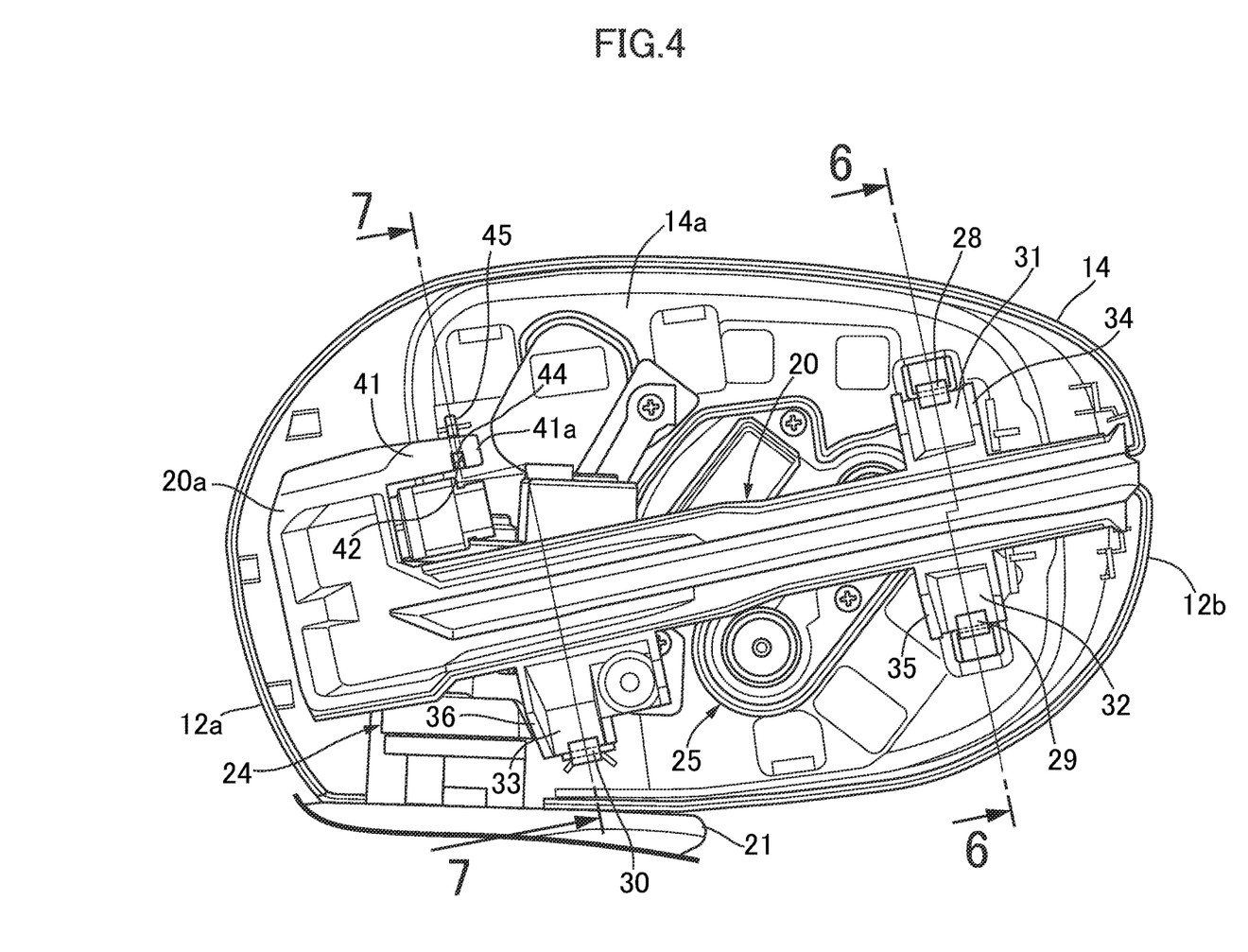
FIG. 4 is a front view when a housing main body is viewed from the side opposite to a mirror in a state in which a cover is omitted. (first embodiment)

Referring in addition to FIG. 4, an electric retraction unit 24 and a mirror angle adjustment unit 25 are housed within the mirror housing 12. The electric retraction unit 24 enables the mirror housing 12 to be pivoted between a raised position in which an extremity portion 12b of the mirror housing 12 protrudes to the side from the front side door and a retracted position in which the mirror housing 12 is retracted toward the front side door, and the mirror angle adjustment unit 25 enables the mirror holder retaining the mirror 11 to be pivoted in left-and-right and up-and-down directions.

The electric retraction unit 24 and the mirror angle adjustment unit 25 are arranged in the vehicle width direction in a state in which the mirror housing 12 is in the raised position, and are fastened to a wall face 14a, facing forward along the vehicle fore-and-aft direction, of the housing main body 14.

Figure 5:
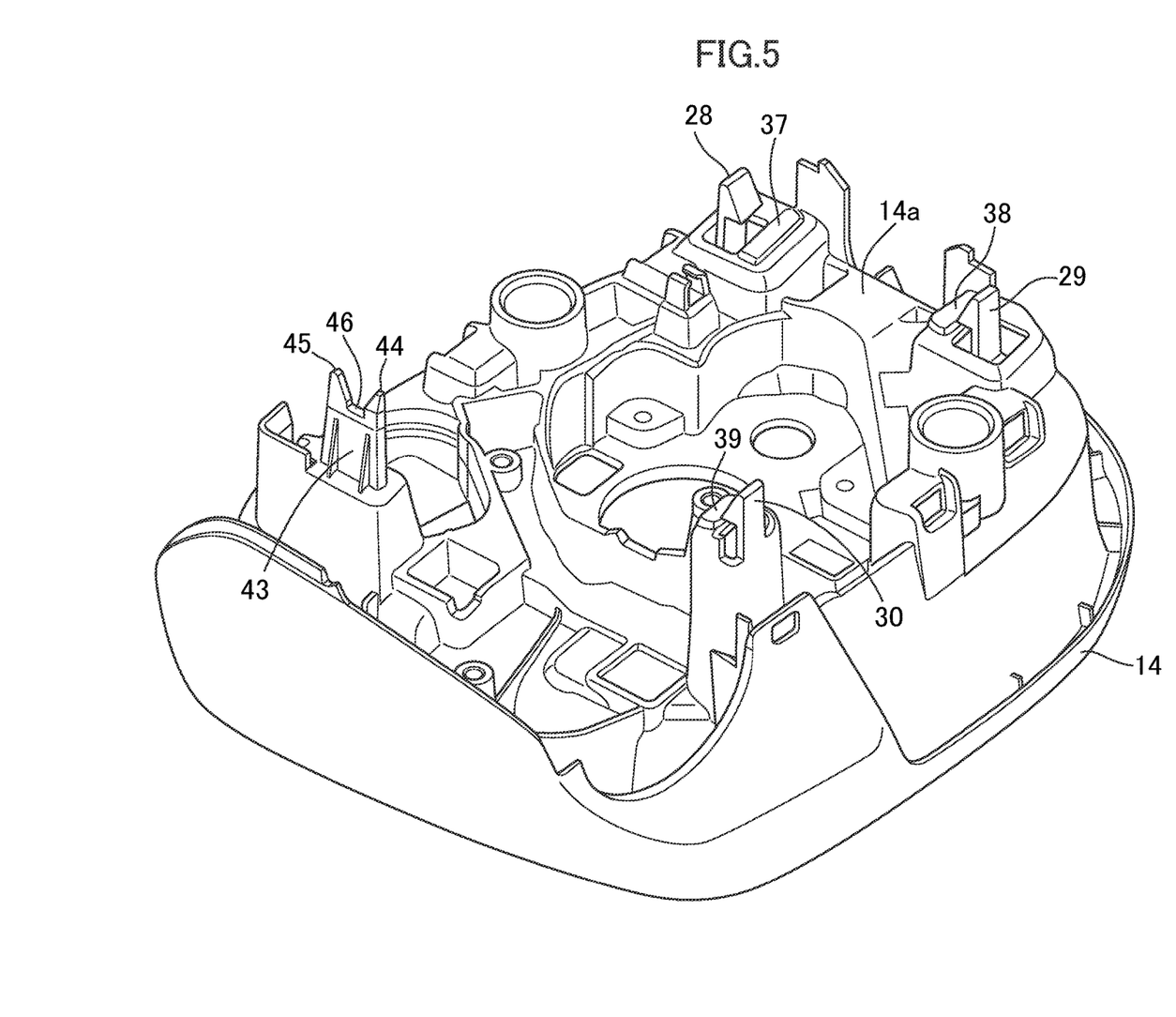
FIG. 5 is a perspective view when the housing main body is viewed from the side opposite to a mirror housing recess part. (first embodiment)
Figure 6:
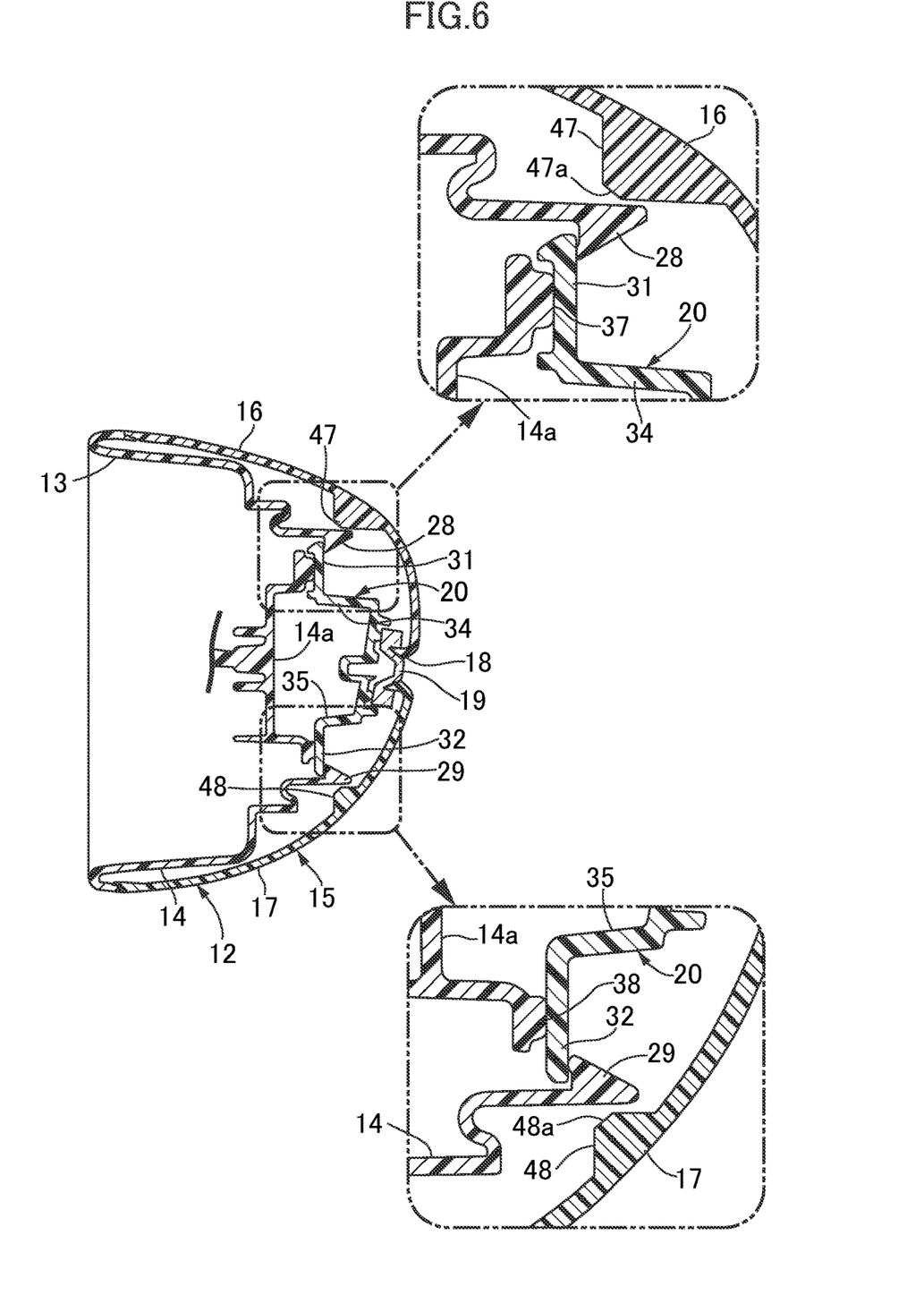
FIG. 6 is a sectional view along line 6-6 in FIG. 4. (first embodiment)
Figure 7:
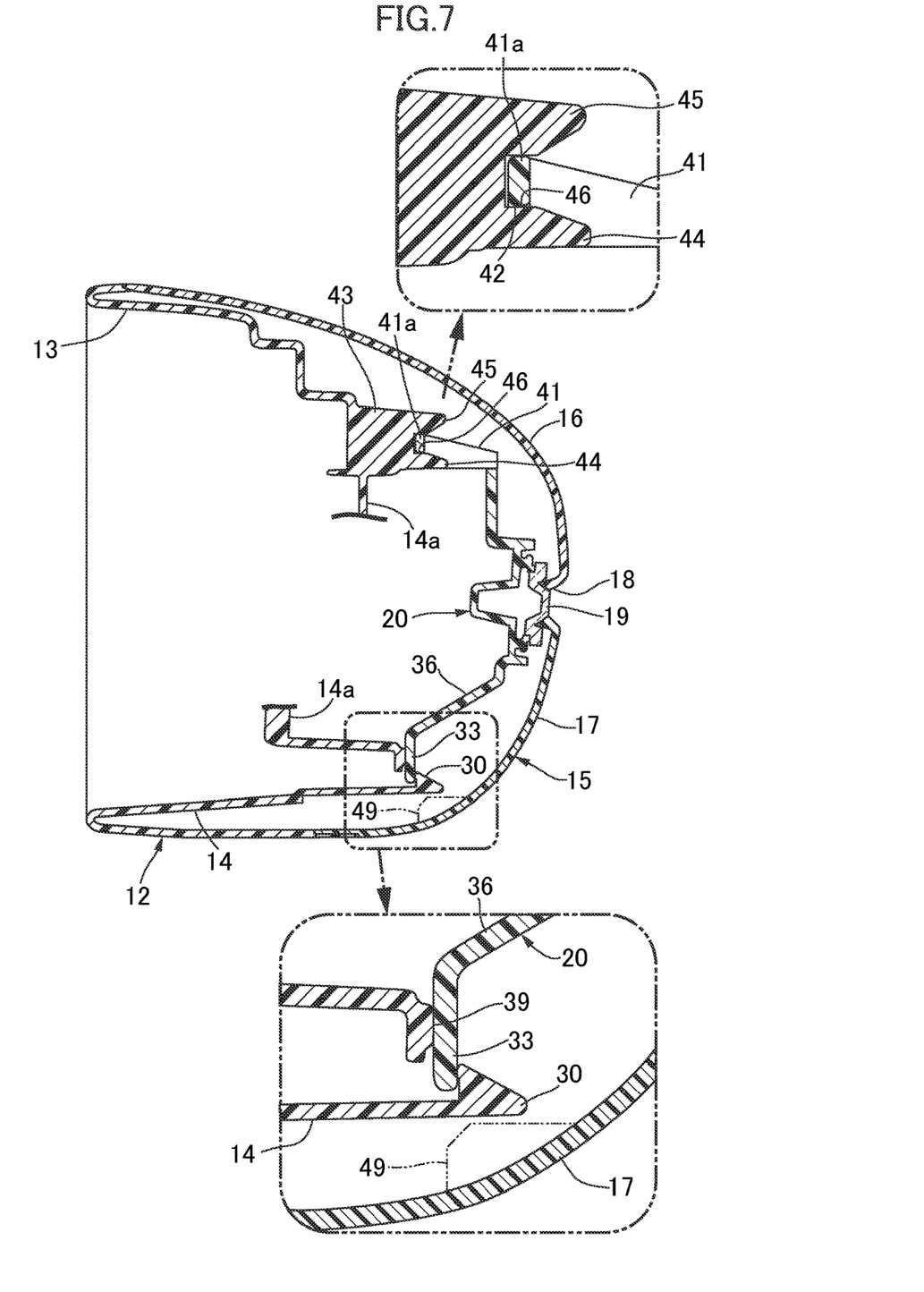
FIG. 7 is a sectional view along line 7-7 in FIG. 4. (first embodiment)

Referring in addition to FIG. 5 to FIG. 7, the lamp unit 20 is formed so as to extend lengthwise along the slit 18, is disposed so as to straddle the electric retraction unit 24 and the mirror angle adjustment unit 25 from the front in the vehicle fore-and-aft direction in a state in which the mirror housing 12 is in the raised position, and is mounted on the housing main body 14 by engaging engagement claws 28, 29, 30 provided on one of the lamp unit 20 and the housing main body 14 with latching parts 31, 32, 33 provided on the other of the lamp unit 20 and the housing main body 14.

In the embodiment, first, second and third engagement claws 28, 29, 30 are provided on the housing main body 14, and first, second and third latching parts 31, 32, 33 are provided on the lamp unit 20.

Provided integrally with the housing main body 14 in the vicinity of the extremity portion 12b of the mirror housing 12 are the first engagement claw 28, which protrudes from the housing main body 14 toward the lamp unit 20 so as to be disposed at a position higher than the lamp unit 20, and the second engagement claw 29, which protrudes from the housing main body 14 toward the lamp unit 20 side so as to be disposed at a position lower than the lamp unit 20. Provided integrally with the housing main body 14 in the vicinity of the base end portion 12a of the mirror housing 12 is the third engagement claw 30, which protrudes from the housing main body 14 toward the lamp unit 20 side so as to be disposed at a position lower than the lamp unit 20.

On the other hand, integrally and projectingly provided on the lamp unit 20 are a first projection 34 that protrudes from an upper part of the lamp unit 20 toward the housing main body 14 side at a position corresponding to the first engagement claw 28, a second projection 35 that protrudes from a lower part of the lamp unit 20 toward the housing main body 14 side at a position corresponding to the second engagement claw 29, and a third projection 36 that protrudes from a lower part of the lamp unit 20 toward the housing main body 14 side at a position corresponding to the third engagement claw 30.

The first projection 34 is formed so as to have a substantially U-shaped cross-sectional shape opening upward, and the first latching part 31 is formed into a flat plate shape connected integrally with an end part, on the housing main body 14 side, of the first projection 34. The second projection 35 is formed so as to have a substantially U-shaped cross-sectional shape opening downward, and the second latching part 32 is formed into a flat plate shape connected integrally with an end part, on the housing main body 14 side, of the second projection 35. Furthermore, the third projection 36 is formed into a substantially U-shaped cross-sectional shape opening downward, and the third latching part 33 is formed into a flat plate shape connected integrally with an end part, on the housing main body 14 side, of the third projection 36.

Provided integrally with the housing main body 14 are a first abutment support part 37 that abuts against the first latching part 31 so as to hold the first latching part 31 between itself and the first engagement claw 28 engaging with the first latching part 31, a second abutment support part 38 that abuts against the second latching part 32 so as to hold the second latching part 32 between itself and the second engagement claw 29 engaging with the second latching part 32, and a third abutment support part 39 that abuts against the third latching part 33 so as to hold the third latching part 33 between itself and the third engagement claw 30 engaging with the third latching part 33.

A positioning arm 41 is provided on an end portion 20a of the lamp unit 20 on the base end portion 12a side of the mirror housing 12, the positioning arm 41 protruding from an upper part of the end portion 20a toward the extremity portion 12b side of the mirror housing 12, and a positioning groove 42 opening downward is formed in a lower part of an extremity portion 41a of the positioning arm 41. On the other hand, projectingly provided integrally with the housing main body 14 at a position corresponding to the extremity portion 41a of the positioning arm 41 is a fourth projection 43 that protrudes toward the positioning arm 41 side, and projectingly provided integrally with an extremity part of the fourth projection 43 are a first positioning projecting part 44 that is inserted into the positioning groove 42 of the positioning arm 41, and a second positioning projecting part 45 that forms between itself and the first positioning projecting part 44 a fitting groove 46 into which the extremity portion 41a of the positioning arm 41 is fitted. That is, the extremity portion 41a of the positioning arm 41 is engaged with the first and second positioning projecting parts 44, 45 of the fourth projection 43, thereby carrying out positioning of the lamp unit 20 in the vicinity of the base end portion 12a of the mirror housing 12.

When an external impact acts on, in particular, the extremity portion 12b side of the mirror housing 12, there is a possibility that, among the first engagement claw 28, the second engagement claw 29 and the third engagement claw 30, which are provided on the housing main body 14 in order to mount the lamp unit 20 on the housing main body 14, engagement of the first engagement claw 28 and the second engagement claw 29, which are disposed on the extremity portion 12b side of the mirror housing 12, with the first latching part 31 and the second latching part 32 will be released, and there is a possibility that the lamp unit 20 will be detached from the housing main body 14 of the mirror housing 12 due to release of the engagement.

In accordance with the present invention, the cover 15, which forms the mirror housing 12 together with the housing main body 14, is provided with a first restriction part 47 that restricts displacement of the first engagement claw 28 in the direction in which engagement thereof with the first latching part 31 is released and a second restriction part 48 that restricts displacement of the second engagement claw 29 in the direction in which engagement thereof with the second latching part 32 is released, and in this embodiment among the upper cover member 16 and the lower cover member 17, which form the cover 15 in cooperation, the first restriction part 47 is provided on the upper cover member 16, and the second restriction part 48 is provided on the lower cover member 17.

Moreover, the first restriction part 47 is provided integrally with the upper cover member 16 so as to protrude in a rib shape toward the housing main body 14 side so that the first restriction part 47 is close to and opposes the first engagement claw 28 when the cover 15 is mounted on the housing main body 14, and the second restriction part 48 is provided integrally with the lower cover member 17 so as to protrude in a rib shape toward the housing main body 14 side so that the second restriction part 48 is close to and opposes the second engagement claw 29 when the cover 15 is mounted on the housing main body 14.

Furthermore, formed on the first restriction part 47 is a first guide portion 47a that is inclined so as to obliquely intersect the direction in which the cover 15 is mounted on the housing main body 14, and formed on the second restriction part 48 is a second guide portion 48a that is inclined so as to obliquely intersect the direction in which the cover 15 is mounted on the housing main body 14. The first guide portion 47a guides mounting of the cover 15 onto the housing main body 14 side by abutting against an extremity part of the first engagement claw 28 when the cover 15 is mounted on the housing main body 14, and the second guide portion 48a guides mounting of the cover 15 onto the housing main body 14 side by abutting against an extremity part of the second engagement claw 29 when the cover 15 is mounted on the housing main body 14.

An upper part of the lamp unit 20 in the vicinity of the base end portion 12a of the mirror housing 12 is positioned by the extremity portion 41a of the positioning arm 41 engaging with the first and second positioning projecting parts 44, 45 on the extremity part of the fourth projection 43, and even when an external impact acts on the extremity portion 12b of the mirror housing 12, the possibility that engagement of the third engagement claw 30 with the third latching part 33 will be released is low; since the possibility that an external impact will be applied directly to the base end portion 12a of the mirror housing 12 is also low, in this embodiment, although no restricting part that restricts displacement of the third engagement claw 30 in the direction in which engagement thereof with the third latching part 33 is released is provided on the lower cover member 17 of the cover 15, as shown by a chain line in FIG. 7, a third restriction part 49 may be provided integrally with the lower cover member 17.

The operation of the embodiment is now explained; the first engagement claw 28 and the second engagement claw 29 provided on the housing main body 14 of the mirror housing 12 are engaged with the first latching part 31 and the second latching part 32 provided on the lamp unit 20. Since the first and second restriction parts 47, 48, which restrict displacement of the first engagement claw 28 and the second engagement claw 29 in the direction in which engagement thereof with the first latching part 31 and the second latching part 32 is released, are provided on the cover 15 forming the mirror housing 12 in cooperation with the housing main body 14, when the lamp unit 20 is mounted on the housing main body 14 of the mirror housing 12, the first engagement claw 28 and the second engagement claw 29 are engaged with the first latching part 31 and the second latching part 32, thus making it possible to prevent the lamp unit 20 from detaching from the housing main body 14 of the mirror housing 12 even if an external impact, etc. acts on the mirror housing 12, while achieving a reduction in cost.

Furthermore, since the first engagement claw 28 and the second engagement claw 29 are provided integrally with the housing main body 14, and the first restriction part 47 and the second restriction part 48 are provided integrally with the upper cover member 16 and the lower cover member 17 of the cover 15 so as to protrude in a rib shape toward the housing main body 14 side so that they are close to and oppose the first engagement claw 28 and the second engagement claw 29 when the cover 15 is mounted on the housing main body 14, it is possible, by merely mounting the cover 15 on the housing main body 14, to restrict displacement of the first engagement claw 28 and the second engagement claw 29 in the engagement release direction.

Moreover, since the first guide portion 47a and the second guide portion 48a, which guide mounting of the cover 15 onto the housing main body 14 side by abutting against the extremity parts of the first engagement claw 28 and the second engagement claw 29 when the cover 15 is mounted on the housing main body 14, are formed on the first restriction part 47 and the second restriction part 48, it becomes easy to mount the cover 15 onto the housing main body 14 and, moreover, it is unnecessary to provide the cover 15 with a special guide portion other than the first restriction part 47 and the second restriction part 48, thus enabling the cost of molding the cover 15 to be reduced.

An embodiment of the present invention is explained above, but the present invention is not limited to the embodiment and may be modified in a variety of ways as long as the modifications do not depart from the subject matter.

The invention claimed is:

1. A vehicular door mirror device comprising a mirror housing that has a mirror housing recess part having a mirror housed therein and a lamp unit that has a side turn lamp having part thereof facing a slit formed in the mirror housing, an engagement claw provided on one of the lamp unit and the mirror housing being engaged with a latching part provided on the other of the lamp unit and the mirror housing, wherein the mirror housing comprises a housing main body that has the mirror housing recess part and is pivotably supported by a base member mounted on a vehicle side door, and a cover that has the slit formed therein and is mounted on the housing main body so as to cover the housing main body from a side opposite to an open direction of the mirror housing recess part, the cover being provided with a restriction part that restricts displacement of the engagement claw toward a direction in which the engagement claw disengages from the latching part.

2. The vehicular door mirror device according to claim 1, wherein the engagement claw is provided integrally with the housing main body, and the restriction part is provided integrally with the cover so as to protrude in a rib shape toward the housing main body side so that the restriction part is close to and opposes the engagement claw when the cover is mounted on the housing main body.

3. The vehicular door mirror device according to claim 2, wherein a guide portion is formed on the restriction part, the guide portion guiding mounting of the cover onto the housing main body side by abutting against an extremity part of the engagement claw when the cover is mounted on the housing main body.

\* \* \* \* \*